US011582109B2

(12) United States Patent
Francis et al.

(10) Patent No.: US 11,582,109 B2
(45) Date of Patent: Feb. 14, 2023

(54) INFORMATION TECHNOLOGY (IT) TOPOLOGY SOLUTIONS ACCORDING TO OPERATIONAL GOALS

(71) Applicant: VMware, Inc., Palo Alto, CA (US)

(72) Inventors: Michael Francis, Morayfield (AU); Peter Legere, Surrey (CA); Justin Patrick McGarry, Austin, TX (US); Ryan Veino, Fredericton (CA); Andrea Siviero, Rho (IT); David James Crane, Bourton on the Water (GB); David James Percy, Loxwood (GB); Kingsley Turner, Duxbury, MA (US)

(73) Assignee: VMWARE, INC., Palo Alto, CA (US)

( * ) Notice: Subject to any disclaimer, the term of this patent is extended or adjusted under 35 U.S.C. 154(b) by 302 days.

(21) Appl. No.: 16/751,750

(22) Filed: Jan. 24, 2020

(65) Prior Publication Data
US 2021/0160144 A1   May 27, 2021

Related U.S. Application Data

(63) Continuation of application No. 16/697,392, filed on Nov. 27, 2019.

(51) Int. Cl.
*H04L 41/12* (2022.01)
*H04L 41/14* (2022.01)
(Continued)

(52) U.S. Cl.
CPC .......... *H04L 41/12* (2013.01); *G06Q 10/0637* (2013.01); *G06Q 10/06393* (2013.01);
(Continued)

(58) Field of Classification Search
CPC ..... H04L 41/12; H04L 41/14; H04L 41/5035; H04L 41/5045; H04L 41/5058; G06Q 10/06393; G06Q 10/06395; G06Q 10/0637
See application file for complete search history.

(56) References Cited

U.S. PATENT DOCUMENTS 10,484,253 B2 * 11/2019 Arsenie .................. H04L 41/12
10,984,425 B1 *  4/2021 Contreras ............ G06Q 10/107
(Continued)

FOREIGN PATENT DOCUMENTS

WO          0125877 A2     4/2001

OTHER PUBLICATIONS

A. Hassan, R. K. Mondol and M. R. Hasan, "Computer network design of a company—A simplistic way," 2015 International Conference on Advanced Computing and Communication Systems, 2015, pp. 1-4, doi: 10.1109/ICACCS.2015.7324121. (Year: 2015).*

(Continued)

*Primary Examiner* — Uzma Alam
(74) *Attorney, Agent, or Firm* — Thomas | Horstemeyer, LLP (57) ABSTRACT

Disclosed are various examples for determining an IT topology for an enterprise IT organization based on operational goals of the enterprise organization. Visual models that are designed to facilitate responses associated with the current IT topology and operational goals of an enterprise IT organization are displayed to an entity of the enterprise. The entity can provide enterprise profile data to an IT solutions system by interacting with user interfaces. The IT solutions system can generate the IT topology prescription and roadmap for implementing the IT topology prescription based on the operational goals identified in the responses. Statements of work can be dynamically generated that outline details (Continued)

and terms of implementing the IT topology prescription for the enterprise IT organization.

20 Claims, 8 Drawing Sheets

(51) Int. Cl.
    *H04L 41/5041*     (2022.01)
    *G06Q 10/06*     (2012.01)
    *H04L 43/091*     (2022.01)
    *G06Q 10/0639*     (2023.01)
    *G06Q 10/0637*     (2023.01)

(52) U.S. Cl.
    CPC .......... *H04L 41/14* (2013.01); *H04L 41/5045* (2013.01); *H04L 43/091* (2022.05); *G06Q 10/06395* (2013.01)

(56) References Cited

U.S. PATENT DOCUMENTS

| | | | | |
|---|---|---|---|---|
| 11,171,989 | B1* | 11/2021 | Kim | H04L 63/18 |
| 11,451,881 | B2* | 9/2022 | Harviainen | G06T 19/003 |
| 2002/0103731 | A1* | 8/2002 | Barnard | G06Q 10/063112 |
| | | | | 705/34 |
| 2008/0126155 | A1* | 5/2008 | Xu | G06Q 10/06375 |
| | | | | 705/7.29 |
| 2009/0307171 | A1* | 12/2009 | Reeves | G06Q 10/06 |
| | | | | 706/47 |
| 2015/0058423 | A1* | 2/2015 | Chen | H04L 67/535 |
| | | | | 709/204 |
| 2015/0100391 | A1* | 4/2015 | Dasgupta | G06Q 10/06393 |
| | | | | 705/7.39 |
| 2015/0193709 | A1* | 7/2015 | Ramesh Babu | G06Q 10/0637 |
| | | | | 705/7.28 |
| 2017/0243056 | A1* | 8/2017 | Cheng | A63B 24/0059 |
| 2017/0270765 | A1* | 9/2017 | Roberts | A61B 5/7405 |
| 2019/0342180 | A1* | 11/2019 | Figueira | H04L 43/065 |
| 2021/0029073 | A1* | 1/2021 | Hyman | H04L 51/046 |

OTHER PUBLICATIONS

A. Mohseni, et al., "Model of requirements engineering for information technology governance based on the COBIT framework in public organizations using the REGIT method . . . " 2017 IEEE 4th International Conference on Knowledge-Based Engineering and Innovation (KBEI), 2017, pp. 0999-1005, (Year: 2017).*

T. 0. Wells, "Electronic and digital signatures: in search of a standard," in IT Professional, vol. 2, No. 3, pp. 24-30, May-Jun. 2000, doi: 10.1109/6294.846202. (Year: 2000).

* cited by examiner

| Problems 303 | Capabilities | Outcomes | Solutions |
|---|---|---|---|
| ☐ Application deployments are not standardized | ■ Abstract and pool compute storage resources | ■ Accurate demand/capacity forecasting | ■ Deploy a log centralization and analysis foundation |
| ■ High CAPEX for hardware | ☐ Alert and report on industry compliance standards | ☐ Automated IT service requests | ■ Deploy a software-defined storage foundation |
| ■ High OPEX for operations | ■ Automaticall recover from hardware failures | ■ Better capacity planning | ■ Deploy a virtual infrastructure foundation |
| ■ High remote office costs | ■ Centralize and analyze all log and audit data | ■ Centralized dashboards | ■ Deploy an operations management foundation |
| ■ Human prone errors | ■ Determine workload mobility sources | ☐ Cost-effective and scalable security architecture | ■ Enable essential SDDC monitoring |
| ■ Lack of standardization | ■ Monitor and manage infrastructure performance and capacity | ■ Easier tracking of user activities | ■ Get statred with operating storage virtualization |
| ■ Long problem detection and resolution times | ☐ Proceed with migration and/or change confidently | ■ Ensure compliance | ■ Get started with operations managment |
| ■ Long workload delivery times | ■ Protect data with encryption | ☐ Expedite service requests | |
| ☐ Not enough data center space | | ■ Faster problem resolution | |
| ■ Not meeting availability service level agreement | | ■ Faster time to market of service | |
| ■ Outdated infrastructure poses a roadblock | | ■ Hardware cosolidation | |
| ☐ Perception of slow IT reaction times | | ■ High Availability | |
| ■ Performance problems | | ☐ Higher trust | |
| ■ Poor availbility | | ■ Improved service quality | |
| ☐ Shadow IT | | ☐ Increased agility | |

| Problems | Capabilities | Outcomes | Solutions |
|---|---|---|---|
| ☐ Application deployments are not standardized | ■ Abstract and pool compute storage resources | ☐ Accurate demand/capacity forecasting | ■ Deploy a log centralization and analysis foundation |
| ■ High CAPEX for hardware | ☐ Alert and report on industry compliance standards | ☐ Automated IT service requests | ■ Deploy a software-defined storage foundation |
| ☐ High OPEX for operations | ■ Automaticall recover from hardware failures | ■ Better capacity planning | ■ Deploy a virtual infrastructure foundation |
| ■ High remote office costs | ■ Centralize and analyze all log and audit data | ☐ Centralized dashboards | ☐ Deploy an operations management foundation |
| ■ Human prone errors | ☐ Determine workload mobility sources | ☐ Cost-effective and scalable security architecture | ☐ Enable essential SDDC monitoring |
| ■ Lack of standardization | ☐ Monitor and manage infrastructure performance and capacity | ■ Easier tracking of user activities | ☐ Get statred with operating storage virtualization |
| ■ Long problem detection and resolution times | ☐ Proceed with migration and/or change confidently | ■ Ensure compliance | ☐ Get started with operations managment |
| ☐ Long workload delivery times | ■ Protect data with encryption | ☐ Expedite service requests | |
| ■ Not enough data center space | | ■ Faster problem resolution | |
| ☐ Not meeting availability service level agreement | | ■ Faster time to market of service | |
| ■ Outdated infrastructure poses a roadblock | | ■ Hardware cosolidation | |
| ☐ Perception of slow IT reaction times | | ■ High Availability | |
| ☐ Performance problems | | ☐ Higher trust | |
| ■ Poor availbility | | ■ Improved service quality | |
| ☐ Shadow IT | | ☐ Increased agility | |

FIG. 7

INFORMATION TECHNOLOGY (IT) TOPOLOGY SOLUTIONS ACCORDING TO OPERATIONAL GOALS

CROSS-REFERENCE TO RELATED APPLICATIONS

This application is a continuation of and claims benefit to U.S. patent application Ser. No. 16/697,392 filed on Nov. 27, 2019, the entire contents of which are hereby incorporated herein by reference.

BACKGROUND

As technology advances, enterprise organizations are continually implementing information technology (IT) infrastructures required for the operation and management of the organization. For example, enterprise organizations are implementing cloud-based solutions for operating the enterprise in addition to providing digital workspaces, such as, for example, bring-your-own device (BYOD) environments, that allow employees to securely use their own devices within the enterprise organization. Digital transformation is important to the growth and survivability of an organization. In addition, digital transformation allows an organization to improve agility, strengthen core capabilities, spark innovation, and power IT to meet business demands.

As an enterprise organization evolves digitally, the enterprise organization may utilize the services and products provided by one or more enterprise solution providers. Enterprise solution providers can provide multiple different types of products or services that can enable an enterprise organization to implement a digital workplace based on the needs of the enterprise organization. Typically, the enterprise solution providers can engage with customers in product-led discussions to provide a discussion about the different services and products offered by the enterprise solution providers. Based on the product-led discussions, an enterprise IT organization can identify different products and services that may be of interest to the organization. In some situations, the enterprise solution providers can be divided into different groups based on different types of products and services offered. In addition, the process to provide the appropriate prescription to the customer can be heavily influenced on the enterprise solution provider's individual knowledge of products and his or her individual consulting skills. These factors can lead to overlap in discussions with enterprise organizations which can result in significantly long deliverable turnaround times, missed opportunities, misaligned projects, and unhappy customers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A and 3B are example user interfaces generated by the IT solutions system of the networked environment of FIG. 1.

DETAILED DESCRIPTION

The present disclosure relates to determining an IT topology for an enterprise IT organization and a roadmap for implementing the IT topology based on operational goals of the enterprise organization. In particular, by discovering and aligning operational goals with IT capabilities, a roadmap for obtaining the IT topology that is unique to the enterprise organization can be determined. An effective IT roadmap can empower an enterprise IT organization with an essential tool that allows the enterprise IT organization to operate efficiently and articulate, gain alignment, and communicate value as an organization.

According to various examples, an entity associated with an enterprise IT organization can be presented one or more visual models (e.g., presentations, documents, user interfaces, video, etc.) via a display of a computing device. In some examples, an entity associated with the enterprise solutions provider can manually present the visual models to the entity of the enterprise organization. The one or more visual models can be designed to extract information about the enterprise IT organization from the entity. For example, the visual models can be used to obtain details about the enterprise IT organization such as, for example, the enterprise name, the enterprise address, a number of employees associated with the enterprise, a net worth of the enterprise, and/or other information. In addition, the visual models can be used to facilitate conversation and extract information that can be used to determine operational goals of the enterprise IT organization, as well as current IT capabilities, a current IT topology, operational challenges that affect the enterprise IT organization, implications for remaining in the current IT topology, and other data associated with the enterprise IT organization.

In some examples, following or during the presentation of the visual models, a user can interact with one or more user interfaces of an IT solutions system associated with an enterprise solutions to provide enterprise characteristics about the enterprise organization (e.g., entering responses into text entry fields, selecting components associated with responses that align with the organization, etc.). Based on the received responses from the entity of the enterprise organization, the IT solutions system can identify operational goals of the enterprise organization, as well as current IT capabilities, a current IT topology, operational challenges that affect the enterprise IT organization, implications for remaining in the current IT topology, and other data associated with the enterprise IT organization. The IT solutions system can determine a proposed IT topology for the enterprise IT organization using the inputted data obtained based on the presentation of the visual models.

In some examples, the IT solutions system can compare the current IT topology of the enterprise with the proposed IT topology determined to align with the operational goals to identify technical gaps between the different topologies. The identification of technical gaps can be used in determining the impact of key performance indicators with respect to the implementation of the proposed IT topology for the organization. The key performance indicators can include revenue, cost, velocity, risk, employee satisfaction (ESAT), customer satisfaction (CSAT), social impact, and/or other types of key performance indicators.

Determining an IT topology based on operational goals of an enterprise organization can be based on a non-linear model that considers different types of IT competencies. For example, IT organizations that function as infrastructure providers build on foundational solution sets leveraging IT competencies that include a virtualize infrastructure, a private cloud, and a hybrid cloud, to drive efficiencies. As the enterprise IT organization develops into a business partner, the IT solutions system can consider agile applications and services, delivered via IT competencies that include Infrastructure-as-a-Service (IaaS), Platform-as-a-Service (PaaS) and Anything-as-a-Service (XaaS). For example, an organization can automate the business application lifecycle for enterprise resource planning (ERP) software to support testing and development to accelerate business process optimization. A digital enterprise can also employ IT competencies such as, for example, DevOps, third platform, and digital convergence to deliver value. By acknowledging the different consumer and cybersecurity themes that are critical to the development of the enterprise IT organization, the IT solutions system can generate an IT topology that aligns with the operational goals of the organization.

According to various examples, each IT competency evaluated can include one or more capabilities that can be used to evaluate the enterprise organization. For example, the capabilities required for the IT competency of a hybrid cloud can include cloud bursting and relevant service metrics. For each IT competency, the enterprise organization can be evaluated to determine whether the current state of the enterprise organization satisfies any of the capabilities for a given IT competency. For example, the IT solutions system can request information associated with the maturity (e.g., not present, enhancement required, capability exists, etc.) and metrics associated with the current state of the capability (e.g., 0-20% implemented) and a desired state of the capability (e.g., 60-80% implemented). The maturity and corresponding metrics can be used to determine whether the enterprise meets the capabilities for a given IT competency.

The IT solutions system can identify the products and services provided by the enterprise solutions provider that can be used to implement the proposed IT topology based on the operations goals and current IT topology identified by the current IT capabilities and corresponding maturity and metrics. The IT solutions system can dynamically generate a user interface that includes one or more statement of works associated with the proposed IT topology and determined roadmap. For example, a statement of work can include a summary of recommended services and products for implementing a proposed IT topology, a pricing schedule for the proposed IT topology, a contract for engaging the services of the enterprise solutions provider for implementing the proposed IT topology, and/or other type of document as can be appreciated. By being able to dynamically generate a statement of work in real time in response to identifying the operational goals of the enterprise IT organization and the proposed IT topology for the organization, the entity of the enterprise IT organization can easily review and understand the IT topology, the services that can be provided to reach the IT topology, and the costs involved with implementing the IT topology in a setting.

The ability to determine an IT topology that aligns with the operational goals of the enterprise organization in real time via interactions with user interfaces designed to obtain specific information about the enterprise organization substantially decreases the amount of time that is typically involved in establishing an IT topology for an organization. For example, the processes for determining an IT topology following a product-based discussion can typically take multiple weeks to present all the products and services that can be provided to the enterprise IT organization and for the enterprise IT organization to appreciate what products are needed to implement the IT topology that the enterprise IT organization believes that it may need. In some examples, the IT solutions system can dynamically generate a statement of work that includes a contract for engaging the services of the enterprise solutions provider that is generated in real-time and allows the enterprise IT organization to provide a digital signature upon a review and agreement of the services and products required to implement the IT topology for the enterprise IT organization. Generating the statement of work in real-time for review and signature drastically reduces the typical time (e.g., multiple weeks or months) required to prepare a statement of work.

Once the enterprise IT organization engages with the services of the enterprise solutions provider, the enterprise solutions provider can implement an IT infrastructure for the enterprise IT organization that is based on determined IT topology and roadmap. Over time, the IT topology of the enterprise IT organization can be reevaluated by accessing the IT solutions system to determine the progress of the enterprise IT organization's transition to the IT topology. If the reevaluation reveals modifications that can be beneficial to the operational goals of the enterprise IT organization, the IT topology can be modified as determined by the IT solutions system.

Figure 1:
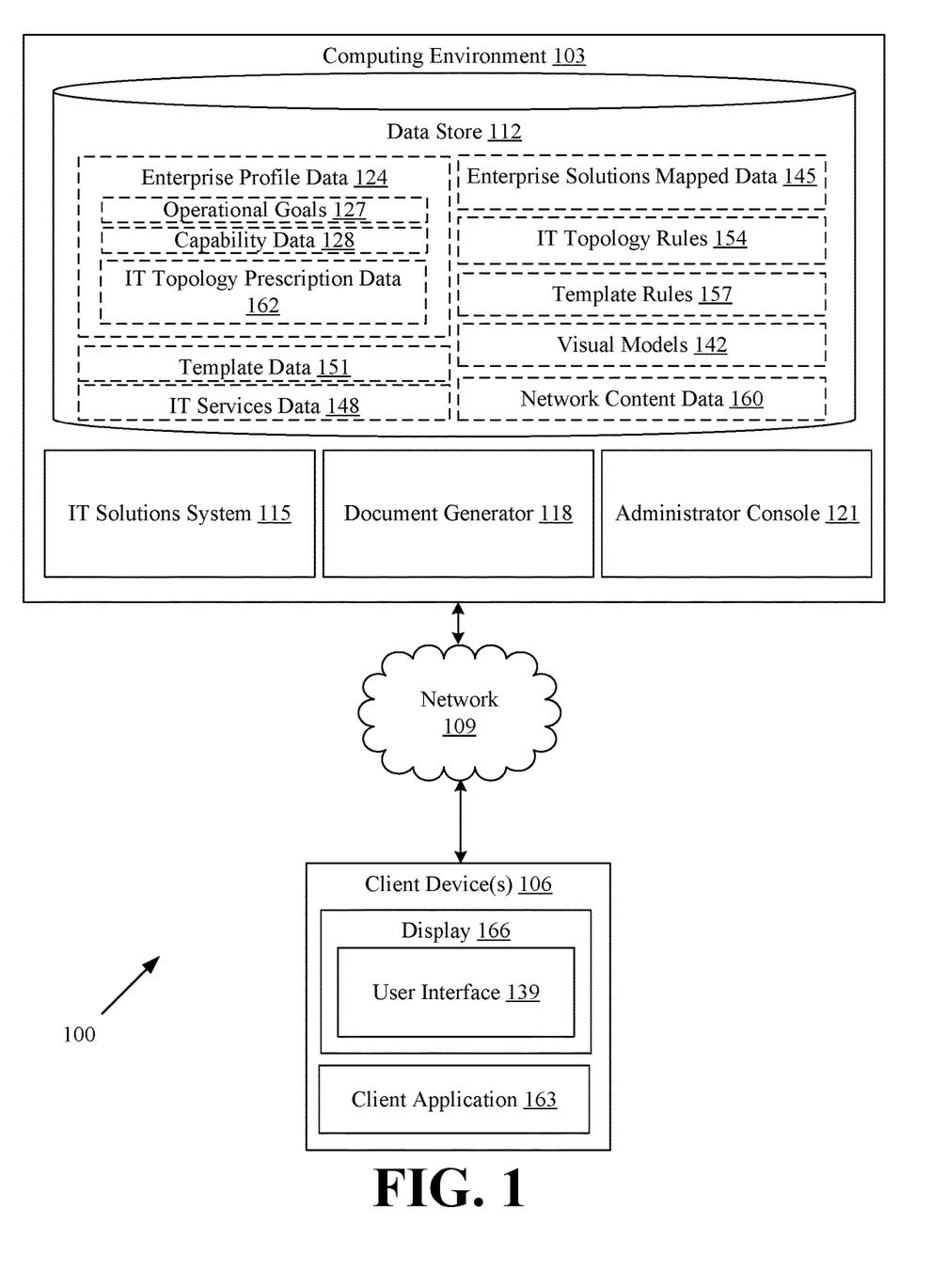
FIG. 1 is a drawing of an example of a networked environment, including a computing environment and a client device.

With reference to FIG. 1, shown is an example of a networked environment 100. The networked environment 100 can include a computing environment 103 and a client device(s) 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environment 103 can include a grid computing resource and/or any other distributed computing arrangement. The computing devices can be located in a single installation or can be distributed among many different geographical locations. The computing environment 103 can also include or be operated as one or more virtualized computer instances. For purposes of convenience, the computing environment 103 is referred to herein in the singular. Even though the computing environment 103 is referred to in the singular, it is understood that a plurality computing environments 103 can be employed in the various arrangements as described above. As the computing environment 103 communicates with the client devices 106 remotely over the network 109, the computing environment 103 can be described as a "remote" or "cloud" computing environment 103 or a collection of one or more computing devices.

The computing environment 103 can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, an IT solutions system 115, a document generator 118, an administrator console 121, as well as other applications, services, processes, systems, engines, or functionality not discussed in detail herein. The IT solutions system 115 can be used to generate an IT topology prescription for an enterprise IT organization based on enterprise profile data 124 associated with the enterprise that is obtained in response to a user interacting with the IT solutions system 115. The enterprise profile data 124 can include standard enterprise information, such as, for example, a name of the enterprise, a size (e.g., number of employees), an industry type (e.g., financial, healthcare, educational, technical, etc.), a location, and/or other information about the enterprise. In addition, the enterprise profile data 124 can include enterprise characteristics, such as, for example, operational goals 127 of the enterprise, capability data 128 that can be used to define a current IT topology of the enterprise, challenges or problems associated with the enterprise, implications for remaining in the current IT topology, and/or other data. In some examples, an enterprise solutions provider can operate the IT solutions system 115 to determine an IT topology prescription for an enterprise IT organization based on the services and products provided by the IT solutions provider.

The IT solutions system 115 can also generate a series of user interfaces 139 that include visual models 142 to display to the entity of the enterprise organization. For example, the visual models 142 can include presentations, videos, audio, pictures, documents, charts, or other type of visualization model that are designed to facilitate a conversation and extract information about the enterprise IT organization. Additionally, the IT solution system 115 can generate user interfaces 139 that can provide interactive components (e.g., text entry boxes, checkboxes, radio boxes, buttons, drop-down lists, etc.) that correspond to different characteristics (e.g., problems, capabilities, outcomes, etc.) of an enterprise IT organization.

The document generator 118 can be used to generate statements of work associated with a proposed IT topology prescription. For example, a statement of work can include a summary of recommended services and products for implementing a proposed IT topology, a pricing schedule for implementing the proposed IT topology, a contract for engaging the services of the enterprise solutions provider for implementing the proposed IT topology, and/or other type of document as can be appreciated. The document generator 118 can select an appropriate statement of work template from a plurality of available of templates and generate the statement of work by populating blank data fields with information that is specific to the enterprise IT organization and the IT topology. The document generator 118 can dynamically generate the statement of work in real-time based on the information obtained from the enterprise IT organization and/or other information.

The administrator console 121 can provide an administrative interface for configuring the enterprise solutions mapped data 145 and IT services data 148 used by the IT solutions system 115 in determining an appropriate IT topology for a given enterprise IT organization. In particular, the administrator console 121 can be accessed by an entity of the enterprise solutions provider that has administrative capabilities or is otherwise accredited to modify the enterprise solutions mapped data 145 and IT services data 148 as can be appreciated. Accordingly, the administrator console 121 can correspond to a web page or web application provided by a web server hosted in the computing environment 103.

The data stored in the data store 112 can include, for example, enterprise profile data 124, template data 151, IT services data 148, enterprise solutions mapped data 145, IT topology rules 154, template rules 157, visual models 142, network content data 160, as well as other data.

The enterprise profile data 124 can include information pertaining to enterprise IT organizations. The enterprise profile data 124 can include standard enterprise information, such as, for example, a name of the enterprise, a size (e.g., number of employees), an industry type (e.g., financial, healthcare, educational, technical, etc.), a location, culture of the enterprise organization and/or other information about the enterprise. In addition, the enterprise profile data 124 can include operational goals 127 of the enterprise, capability data 128, IT topology prescription data 162, challenges of the enterprise, implications for remaining in the current IT topology, and/or other data.

The operational goals 127 can correspond to a desired future state of an enterprise organization that can be verified through measurable results. Some example operational goals 127 for an enterprise organization can include operational expenditure (OPEX) reduction, capital expenditure (CAPEX) reduction, IT service delivery time in minutes, improved security to effort ratio, secure delivery of mobile applications, improved uptime, reduced energy consumption, and/or other types of operational goals.

The capability data 128 can include data that defines the current IT topology of the enterprise organization according to the capabilities of the enterprise organization for each of the different types of IT competencies. For example, the capability data 128 can include data indicating the maturity and metrics of the capabilities required for each IT competencies based on responses to questions provided on user interfaces 139 of the IT solutions system 115. The capability data 128 can be used to determine a current IT topology of the enterprise (e.g., current infrastructure, digital platforms, current applications and services, etc.) by understanding the maturity and metrics associated with each capability for each type of IT competency.

The IT topology prescription data 162 can include the proposed IT topology generated by the IT solutions system 115 based on an analysis of the capability data 128 and the operational goals 127 of the enterprise organization. For example, the IT topology prescription data 162 can define the proposed infrastructure, platforms, applications and services, and/or other information that is used to implement the proposed IT topology for the enterprise organization.

The template data 151 can include various templates of statements of work that can be used to generate the statements of work for an enterprise IT organization according to the determined IT topology. The templates can include one or more templates for a summary of recommended services and products for implementing a proposed IT topology, a pricing schedule for the proposed IT topology, a contract for engaging the services of the enterprise solutions provider for implementing the proposed IT topology, and/or other type of document as can be appreciated. For each type of statement of work, the template data 151 can include different types of templates. For example, there may be statement of work templates that correspond to industry type, enterprise size, enterprise revenue, IT topologies and/or other factors. The templates included in the template data 151 can include open data fields that can correspond to the enterprise profile data 124 and the IT topology determined based on the operational goals 127.

The IT services data 148 can include the different services and products that can be provided by an enterprise solutions provider to implement a given IT topology. For example, the services and products may include VMWARE WORKSPACE ONE, VMWARE VREALIZE, VMWARE NSX, VMWARE VSPHERE, VMWARE VSAN, VMWARE VCLOUD, and/or other products and services as can be appreciated.

The enterprise solutions mapped data 145 can include a mapping of IT capabilities, current problems of the enterprise organization, operational goals 127, and/or other data with products and services. For example, an operational goal 127 that includes "accurate demand/capacity forecasting" may be mapped to a service that relates to "deploying an operations management foundation." Similarly, a capability of "monitoring and managing infrastructure performance and capacity" may also be mapped to a service that relates to "deploying an operations management foundation." In some examples, the IT solutions system 115 can generate user interfaces 139 that include a listing of different types of known operational goals 127, capabilities, challenges, implications, etc, that correspond to components that may be selected by a user. In addition, the enterprise solutions mapped data 145 can include mappings between capabilities, operational goals 127, and products and services based on a defined maturity and metric associated with a given capability.

The IT topology rules 154 include rules, models, and/or configuration data for the various algorithms or approaches employed by the IT solutions system 115. For example, the IT topology rules 154 can include the various models and/or algorithms used by the IT solutions system 115 in determining IT topology prescription for an enterprise organization based on the operational goals 127, capability data 128, and/or other enterprise profile data 124 associated with the enterprise organization. In some examples, the IT topology rules 154 can include rules that determine a priority when there are conflicting services and/or products that identified based on the different capabilities and/or operational goals 127 of an enterprise organization. For example, if Service A and Service B are identified as potential services to be included in a proposed IT topology for an organization, the IT topology rules 154 can be used by the IT solutions system 115 to determine if both Service A and Service B can be used, if Service A can replace Service B, if Service B can replace service, or if a further evaluation is required.

In some examples, the IT topology prescription data 162 can be generated according to an understanding of the importance of different key performance indicators for a given enterprise organization. For example, an enterprise organization may prefer an IT topology where the cost impact is given a greater weight than a social impact. In this example, the IT topology rules 154 can include weights to assign to different key performance indicators based on the enterprise profile data 124 and other information obtained through the presentation of the visual models 142. The IT solutions system 115 can use the IT topology rules 154 to assign weights to the different key performance indictors and rank the key performance indicators, accordingly. As such, the IT solutions system 115 can generate an IT topology that considers the preference of the enterprise organization.

The template rules 157 can include rules, models, and/or configuration data for the various algorithms or approaches employed by the document generator 118. For example, the template rules 157 can include the various models and/or algorithms used by the document generator 118 in selecting and generating statement of works for the IT solution system 115.

The visual models 142 can include presentations, videos, audio, pictures, documents, charts, or other type of visualization model that are designed to facilitate a conversation and extract information about the enterprise IT organization. According to various examples, the visual models 142 can be displayed to a user via one or more user interfaces 139 of the IT solutions system 115. The visual models 142 can be designed to facilitate conversation and extract information that can be used to determine operational goals of the enterprise IT organization, as well as current IT capabilities, a current IT topology, a current operational status of the enterprise, operational challenges that affect the enterprise IT organization, implications for remaining in the current IT topology, key performance indicators, an importance associated with the different key performance indicators, and other data associated with the enterprise IT organization.

The network content data 160 can include various data employed in generating user interfaces 139 and/or other network pages. The network content data 160 can include hypertext markup language (HTML), extensible markup language (XML), cascading style sheets (CSS), images, text, audio, video, templates, and/or other data.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include the operating system, which can be configured to execute various client applications 163, as well as other applications. In particular, the operating system can include a system software that facilitates operation of the client device 106, and execution of additional client applications. Some client applications 163 can access network content served up by the computing environment 103 or other servers, thereby rendering a user interface 139 on a display 166, such as a liquid crystal display (LCD), touch-screen display, or other type of display device. To this end, some client applications 163 can include a browser or a dedicated application, and a user interface 139 can include a network page, an application screen, or other interface. In some examples, a network page can include a web page having source code defined in hypertext markup language (HTML), cascading style sheets (CSS), Javascript, jQuery, or other applicable client-side web-based scripting language. Further, other client applications 163 can include device management applications, enterprise applications, social networking applications, word processors, spreadsheet applications, media viewing applications, instant messaging applications, or other applications.

Figure 2:
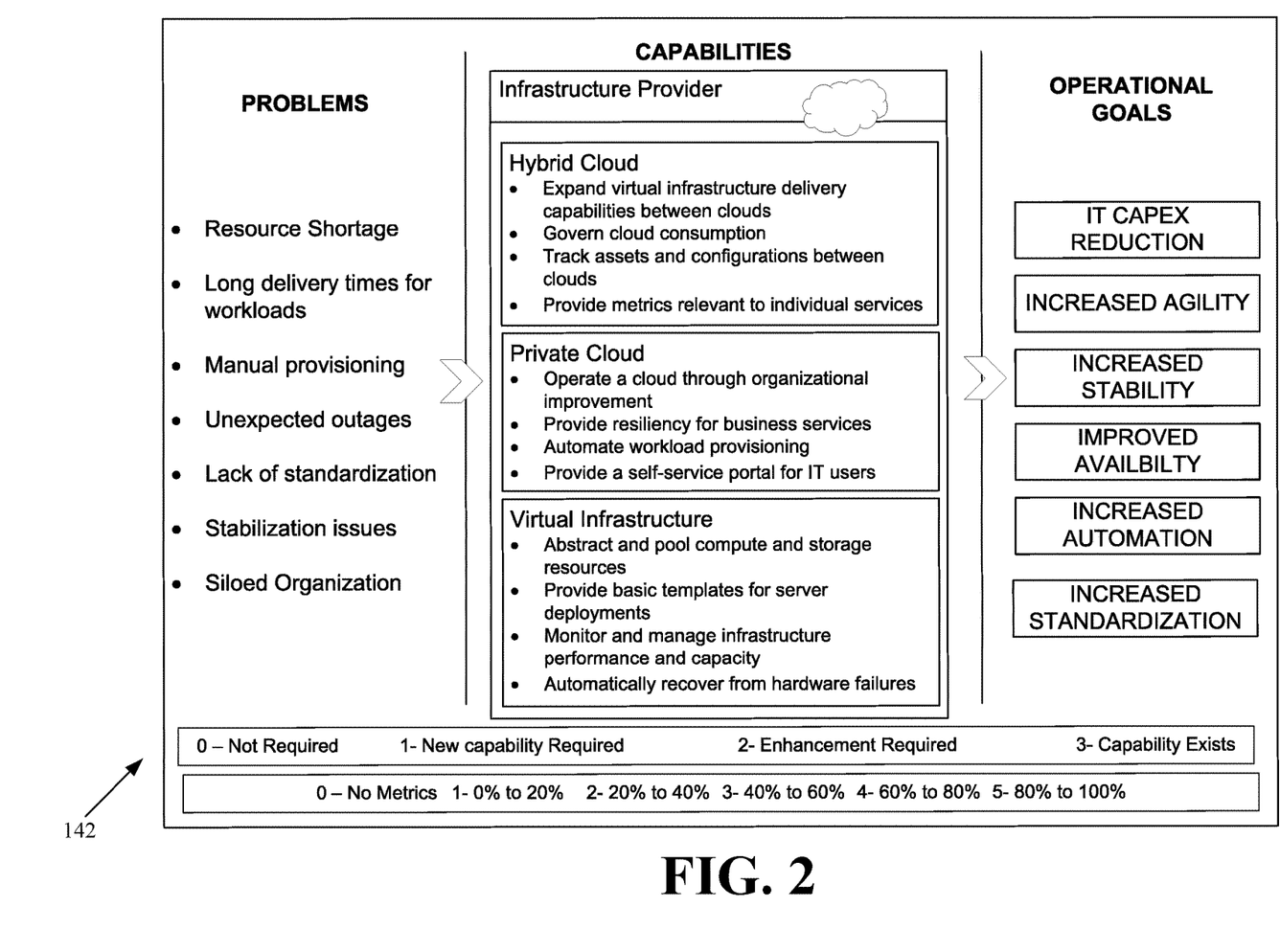
FIG. 2 is an example of a visual model presented by the IT solutions system of the networked environment of FIG. 1.

Moving on to FIG. 2, shown is an example of a visual model 142 that may be displayed to a user interacting with the IT solutions system 115. The visual model 142 is designed to facilitate conversation and extract information from an enterprise organization that can be used to identify the problems, capabilities, and operational goals 127 of the enterprise organization. The visual model 142 of FIG. 2 corresponds to problems and operational goals 127 that can be related to the IT infrastructure of an enterprise IT organization. In particular, FIG. 2 illustrates the relationship between the problems and operational goals 127 of an organization with the different IT competencies (e.g., hybrid cloud, private cloud, and virtual infrastructure) of the IT infrastructure and corresponding capabilities. By being able to view the different capabilities for each IT competency, the user is able to identify which capabilities apply to the current state of the enterprise organization. In addition, the user can define the maturity and metrics associated with each capability.

Referring next to FIGS. 3A and 3B, shown are example user interfaces 139 (e.g., 139a, 139b) that can be presented to a user interacting with the IT solutions system 115. In particular, FIGS. 3A and 3B illustrate example user interfaces 139 generated by the IT solutions system 115 to include enterprise characteristics, such as, for example, the problems associated with enterprise organization, capabilities of the enterprise organization, operational goals 127 of the enterprise organization, and other characteristics of the enterprise organization. In addition, the user interfaces 139 include solutions elements that define the products and services that can be used to implement a proposed IT topology. According to various examples, the user interfaces 139 can be generated in real time based on responses provided by the enterprise organization or other entity.

As shown in FIGS. 3A and 3B, each element in the different categories (e.g., enterprise characteristics and solution elements) is associated with a corresponding selectable component 303. The IT solutions system 115 can prepopulate the corresponding selectable components 303 based on the responses that define the enterprise profile data 124 of the enterprise organization. In addition, the solution elements that are selected can be based on solutions elements defined in the enterprise solutions mapped data 145 that are mapped to the determined operational goals 127, capabilities, and problems of the enterprise organization.

In various examples, although the selectable components 303 can be prepopulated by the IT solutions system 115, a user can interact with the user interface 139 by selecting and deselecting the different selectable components 303. The selection and/or deselection of various selectable components 303 can adjust the overall IT topology prescriptions in real time. For example, a deselection of solution element can directly affect which problems, capabilities, and/or operational goals 127 are selected. FIGS. 3A and 3B illustrate this feature. For example, FIG. 3A illustrates a selection of solution elements that correspond to the selected problems, outcomes, and capabilities that the IT solutions system 115 identified as being associated with the enterprise organization. In FIG. 3B, the user has deselected the final four solution elements causing a modification of the problems, operational goals, and capabilities that are selected. Accordingly, the user is able to modify the analyzed data to correct or otherwise adjust the operational goals 127, capabilities, problems, and/or solutions elements as can be appreciated. In addition, the visual relationship between the solution elements and problems, capabilities, and operational goals 127 of the enterprise organization that is shown in FIGS. 3A and 3B can be useful in allowing the user to better understand why certain solution elements may be required.

Figure 4:
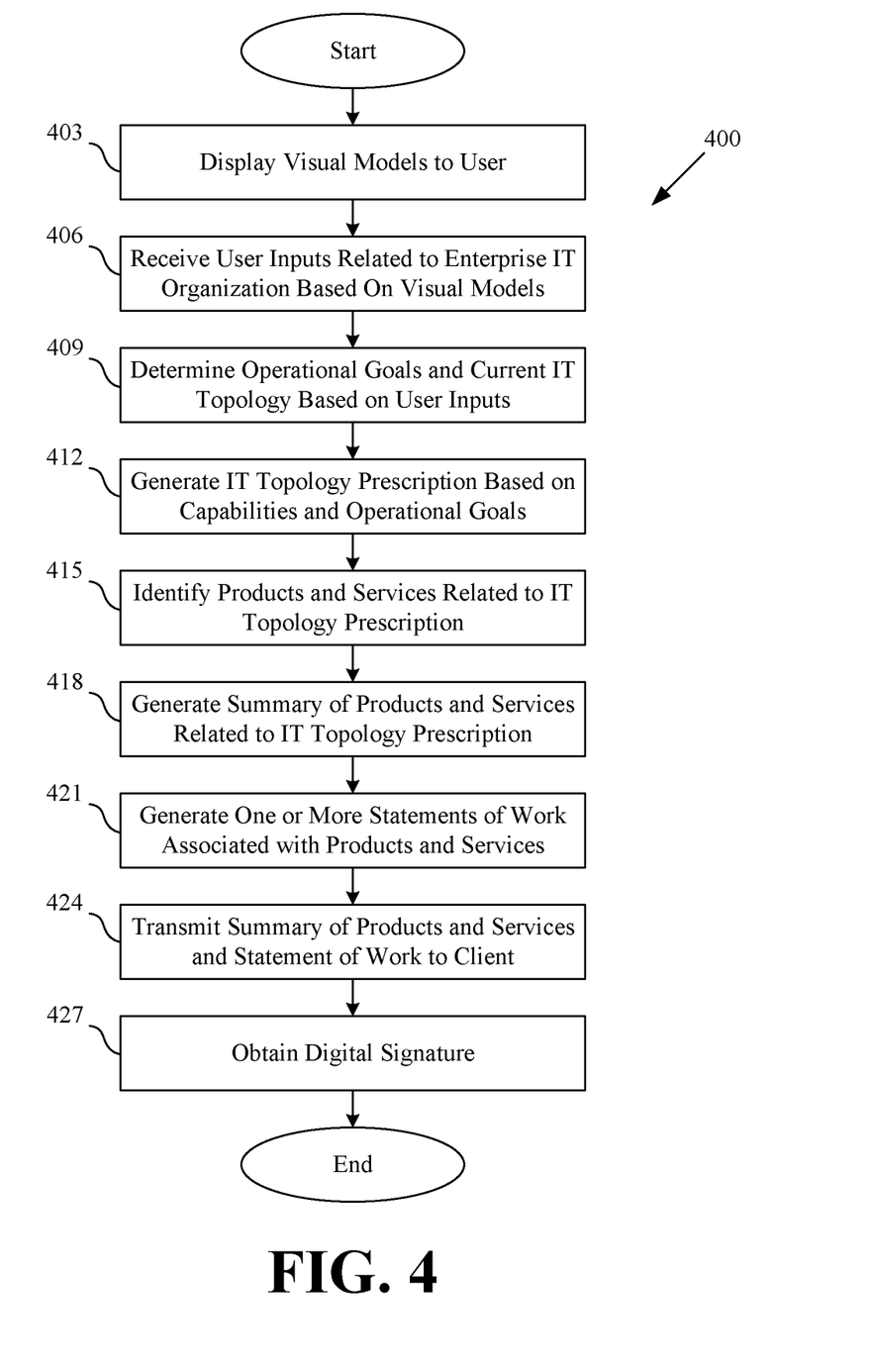
FIGS. 4-7 are example flowcharts illustrating functionality implemented at least in part by components of the networked environment.

Moving on to FIG. 4, shown is a flowchart 400 that provides one example of the operation of a portion of the computing environment 103. The flowchart of FIG. 4 can be viewed as depicting an example of elements of a method implemented by the IT solutions system 115, document generator 118, or other suitable software component according to one or more examples. The separation or segmentation of functionality as discussed herein is presented for illustrative purposes only.

In step 403, the IT solutions system 115 causes one or more visual models 142 to be rendered via a display 166 or other output device of a client device 106. The visual models 142 can include presentations, videos, audio, images, documents, charts, or other type of visualization model that are designed to facilitate a conversation and extract information about the enterprise IT organization. The visual models 142 are designed to be displayed to an entity of an enterprise IT organization to facilitate conversation and extract information about the enterprise IT organization. Although the visual models 142 are discussed as being presented as part of the IT solutions system 115 as the entity interacts with the IT solutions system 115, in some examples, the visual models 142 can be manually presented to the entity by an accredited entity of an enterprise solutions provider.

In step 406, the IT solutions system 115 receives user inputs related to the enterprise IT organization based on the presentation of the visual models 142. The one or more visual models 142 can be aligned with user interfaces 139 that include interactive components that allow a user to select or enter responses associated with the visual models 142. For example, the user interfaces 139 can have components that allow a user to enter standard information about the enterprise IT organization (e.g., name, size, industry, address, etc.). In addition, the user interface 139 can have a listing of different characteristics (e.g., customer problems, capabilities, outcomes, solution elements, etc.) in which a user can select corresponding components for the characteristics that apply to the organization based on the visual models 142. In some examples, a user can provide inputs associated with an importance of a particular characteristic. For example, a user interface can present a scaling request that requires the user to input a number in a range (e.g., range of 1-100) indicates the scope or scale of a particular characteristic.

In step 409, the IT solutions system 115 analyzes the data received via the user inputs to determine operational goals 127 and the current IT topology of the enterprise organization. For example, the selected responses by the user can be used to identify the operational goals 127 and generate the current IT topology of the enterprise organization.

In step 412, the IT solutions system 115 generates IT topology prescription data 162 for the enterprise IT organization based on the capability data 128 and the operational goals 127. For example, using one or more models in the IT topology rules 154 and the enterprise solutions mapped data 145, the IT solutions system 115 can generate the IT topology prescription data 162 used to define the proposed IT topology by aligning IT solutions with the operational goals 127 identified by the entity of the enterprise IT organization. The IT solutions system 115 can use the enterprise solutions mapped data 145 to products and services for the proposed IT topology for the enterprise organization.

In step 415, the IT solutions system 115 identifies the products and services related to the proposed IT topology. By understanding the solution elements of the IT topology prescription and a defined roadmap for implementing the proposed IT topology, the IT solutions system 115 can access the IT services data 148 to identify which products and services can be used to implement the proposed IT topology for the enterprise IT organization.

In step 418, the document generator 118 generates a summary of products and services that are related to the IT topology prescription. The summary can include a listing of products and services that are required for implementing the IT topology. In some examples, the summary can include a description of each of the products and services to allow the user to become better acquainted with the different products and services. The summary can further include a pricing sheet associated with the different products and services. In some examples, the summary can include selectable links associated with each of the products, that when selected, can redirect the user to a product detail page that provides additional information about the product or service. In addition to a summary of products and services, in some examples, the document generator 118 can generate additional documentation related to the products and services related to the IT topology prescription, such as, for example, pricing sheets, product manuals, product installation guides, and/or other types of documentation.

In step 421, the document generator 118 generates one or more statements of work associated with the products and service. For example, a statement of work can include a summary of recommended services and products for implementing a proposed IT topology, a pricing schedule for the proposed IT topology, a contract for engaging the services of the enterprise solutions provider for implementing the proposed IT topology, and/or other type of document as can be appreciated. The document generator 118 can select an appropriate statement of work template from a plurality of available of templates and generate the statement of work by populating blank data fields with information that is specific to the enterprise IT organization and the IT topology. The document generator 118 can dynamically generate the statement of work in real-time based on the information obtained from the enterprise IT organization and/or other information.

In step 424, the IT solutions system 115 transmits the generated summary(ies), statement(s) of work, and/or other relevant documents (e.g., install guides, product manuals, pricing sheets, etc.) to the client device 106 for rendering on a display 166. As such, in real-time, the user can review the different statement of works associated with the proposed IT topology and corresponding roadmap for implementing the proposed IT topology. In some examples, a statement of work can have a component that allows a user to submit a digital signature to engage the services of the enterprise solutions provider.

In step 424, the IT solution system 115 receives a digital signature accepting the terms of the statement or work. In an instance in which the IT solutions system 115 receives the digital signature, the IT solution system 115 can initiate the implementation of the proposed IT topology according to the terms identified in the statement of work. Thereafter, the process proceeds to completion.

Figure 5:
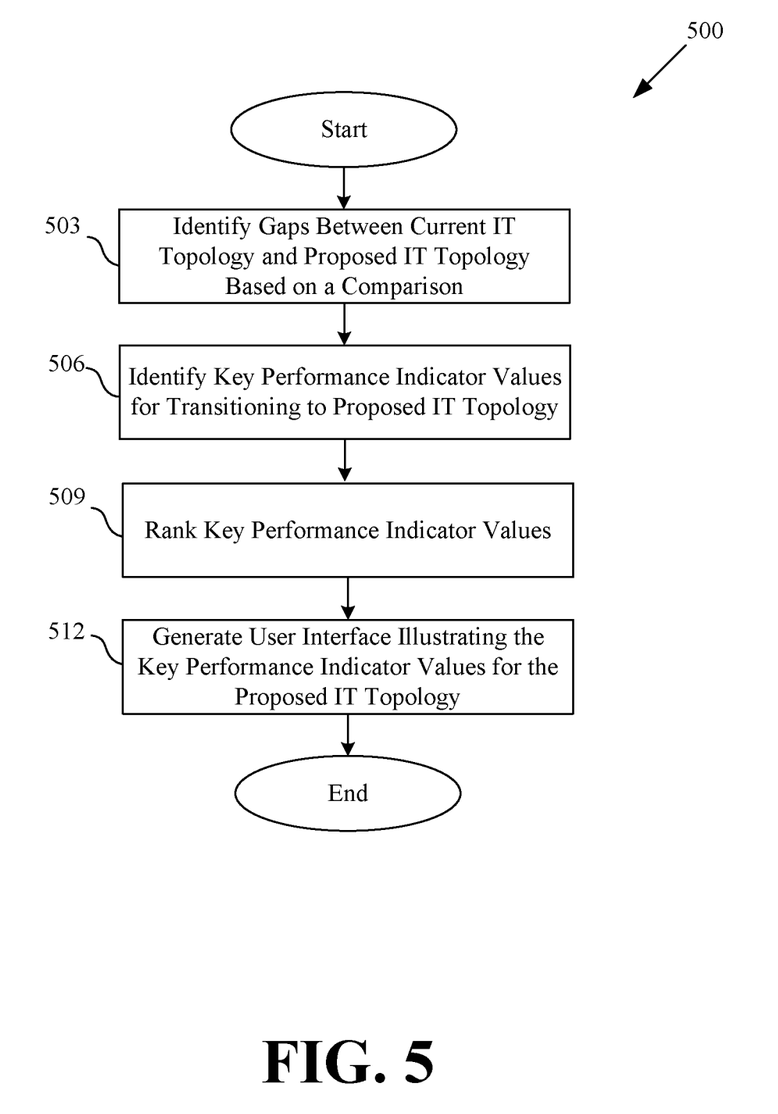

Moving on to FIG. 5, shown is a flowchart 500 that provides one example of the operation of a portion of the computing environment 103. The flowchart of FIG. 5 can be viewed as depicting an example of elements of a method implemented by the IT solutions system 115, document generator 118, or other suitable software component according to one or more examples. The separation or segmentation of functionality as discussed herein is presented for illustrative purposes only.

In step 503, the IT solutions system 115 compares the current IT topology with the proposed IT topology to determine technical gaps. For example, the IT solutions system 115 can identify technical gaps in cloud computing, digital securing, data analytics, network architecture, mobility management, operational capabilities, and/or other type of technical gaps.

In step 506, the IT solutions system 115 can identify key performance indicator value for transitioning to the proposed IT topology. For example, the key performance indicators can include revenue, cost, velocity, risk, ESAT, CSAT, social impact, and/or other types of key performance indicators. The technical gaps identified can have a direct effect on the different key performance indicators. The transition between a current state and a future state may affect the key performance indicators differently. As such, the IT solutions system 115 can identify the values associated with each of the key performance indicators based on the technical gaps and models included in the IT topology rules 154.

In step 509, the IT solutions system 115 ranks the key performance indicators based on the key performance indicator value.

In step 512, the IT solutions system 115 generates a user interface illustrating how the proposed IT topology impacts the enterprise organization according to the ranked key performance indicators. For example, the IT solutions system 115 may generate a user interface that includes a bar chart, or other type of visual representation, that can illustrate the impact of transitioning to the proposed IT topology according to the key performance indicators. The IT solutions system 115 can transmit the user interface 139 to a client device 106 for rendering on a display 166. Thereafter, the process proceeds to completion.

Figure 6:
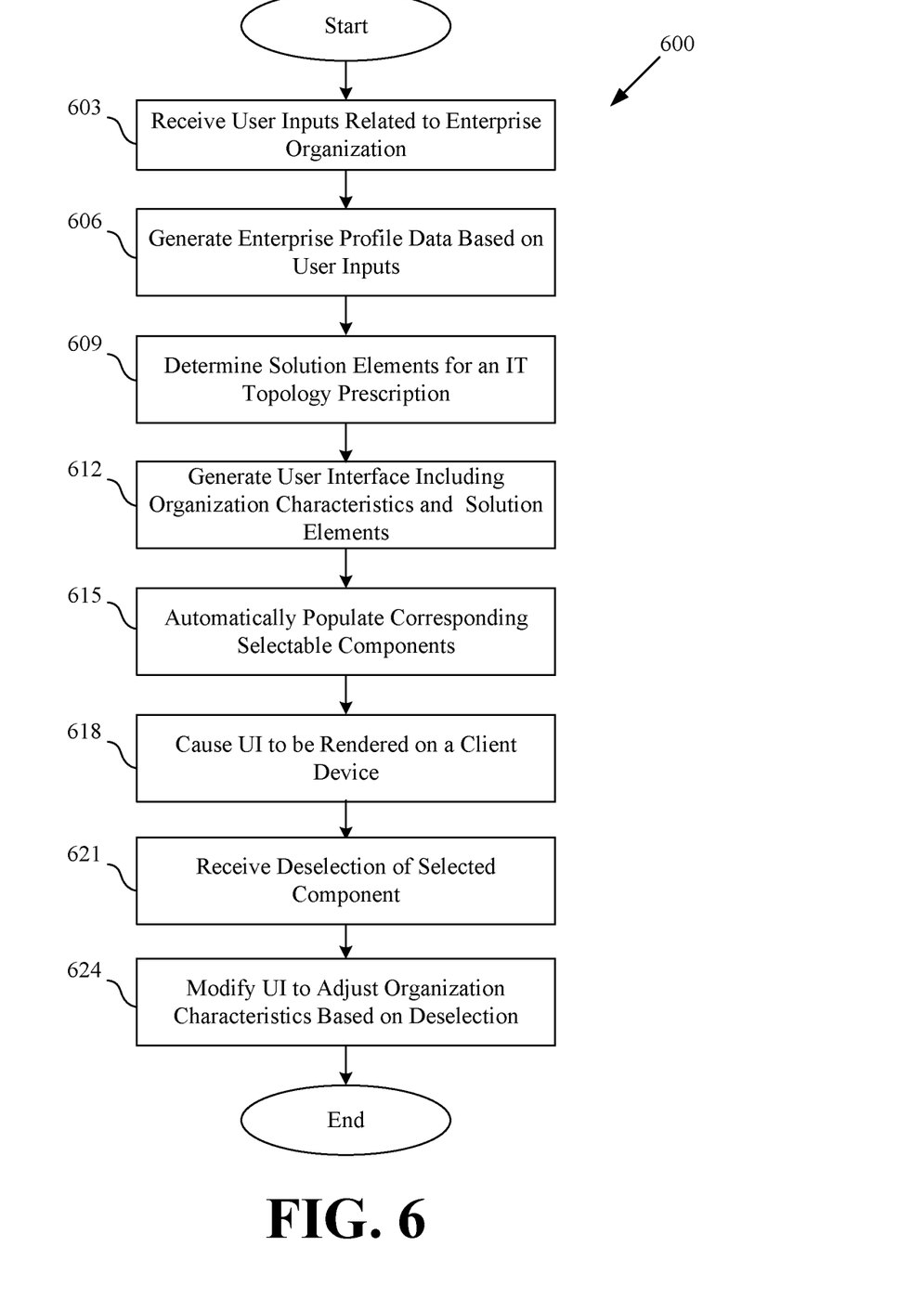

Moving on to FIG. 6, shown is a flowchart 600 that provides one example of the operation of a portion of the computing environment 103. The flowchart of FIG. 7 can be viewed as depicting an example of elements of a method implemented by the IT solutions system 115, document generator 118, or other suitable software component according to one or more examples. The separation or segmentation of functionality as discussed herein is presented for illustrative purposes only.

In step 603, the IT solutions system 115 receives user inputs related to the enterprise organization. For example, a user interacting with user interfaces 136 of the IT solutions system 115 can provide enterprise profile data 124. The user interfaces 139 can include interactive components that allow a user to select or enter information associated with the enterprise organization. For example, the user interfaces 139 can have components that allow a user to enter standard information about the enterprise IT organization (e.g., name, size, industry, address, etc.). In addition, the user interface 139 can have a listing of different characteristics (e.g., customer problems, capabilities, outcomes, solution elements, etc.) in which a user can select corresponding components for the characteristics that apply to the organization based on the visual models 142. In some examples, a user can provide inputs associated with an importance of a particular characteristic. For example, a user interface can present a scaling request that requires the user to input a number in a range (e.g., range of 1-100) indicates the importance of a particular characteristic.

In step 606, the IT solutions system 115 can generate enterprise profile data 124 based on the information received through the user inputs. For example, the IT solutions system 115 can generate the operational goals 127 and capability data 128 using the information provided by the user interacting with the user interfaces 139. In some examples, the user interfaces 139 request specific information that is associated with the operational goals 127, capabilities, and/or other information that can be used to generate the enterprise profile data 124.

In step 609, the IT solution system 115 can determine solution elements for an IT topology prescription for the enterprise organization based on the generated enterprise profile data 124. For example, the IT solution system 115 can apply the IT topology rules 154 to analyze the enterprise profile data 124, including the capability data 128 and the operational goals 127 and determine the IT topology prescription. In addition, the IT solution system 115 can use the enterprise solutions mapped data 145 to identify the appropriate solution elements for the IT topology prescription.

In step 612, the IT solutions system 115 can generate a user interface 139 includes a listing of organization IT characteristics (e.g., organization problems, organization capabilities, operational goals 127, etc.) as well as solution elements that can be used to define an IT topology prescription. The user interface 139 generated can be similar to those of FIGS. 3A and 3B. As such, the user interface 139 can be generated to include selectable components 303 for each feature of each organization IT characteristic and solution element.

In step 615, the IT solutions system 115 can automatically populate the corresponding selectable components that apply to the determined solution elements and enterprise profile data 124 for the enterprise organization. For example, while the user interface may include a listing of multiple different problems that an organization may encounter, only the problems that apply to the enterprise organization will displayed as selected. In another example, only the solution elements that have been determined to apply to the determined IT topology prescription will be selected.

In step 618, the IT solutions system 115 can cause the user interface 139 to be rendered on a client device 106. For example, the IT solutions system 115 can transmit the user interface 139 to the client device 106 for rendering on the client device 106.

In step 621, the IT solutions system 115 can receive a deselection of a selected selectable component 303 on the user interface 139. For example, a user interacting with the user interface 139 may wish to modify the selected elements presented in the user interface 139. As such, the IT solutions system 115 can deselect the corresponding component 303 to indicate that the particular element is not to be applied.

In step 624, the IT solutions system 115 can modify the user interface to adjust the selected organization characteristics based on the deselection. For example, since the solution elements are directly related to the enterprise profile data 124 presented, if the user deselects a particular element associated with a problem or capability, a selected solution element may no longer apply based on the adjusted organization characteristics. As such, the IT solutions system 115 can determine that a selected solution element should no longer be selected based on the change and modify the user interface to deselect the affected solution element and/or other organization characteristics that are also affected. The IT solutions system 115 can transmit the modified user interface 139 to the client device 106 for rendering. Thereafter, the process can proceed to completion.

Figure 7:
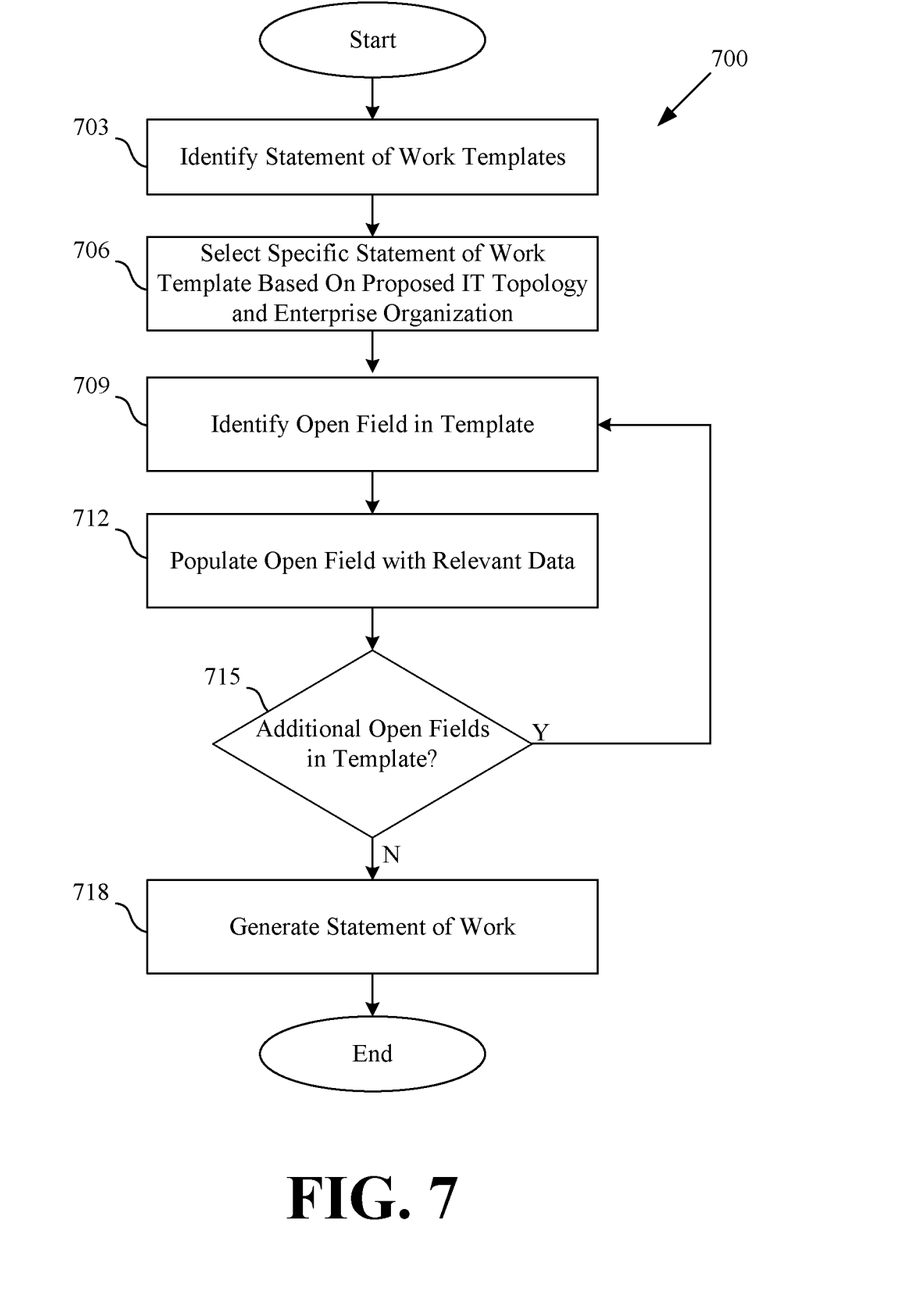

Moving on to FIG. 7, shown is a flowchart 700 that provides one example of the operation of a portion of the computing environment 103. The flowchart of FIG. 7 can be viewed as depicting an example of elements of a method implemented by the IT solutions system 115, document generator 118, or other suitable software component according to one or more examples. The separation or segmentation of functionality as discussed herein is presented for illustrative purposes only.

In step 703, the document generator 118 identifies statement of work templates from the template data 151. The statement of work templates can include one or more templates for a summary of recommended services and products for implementing a proposed IT topology, a pricing schedule for the proposed IT topology, a contract for engaging the services of the enterprise solutions provider for implementing the proposed IT topology, and/or other type of document as can be appreciated. For each type of statement of work, the template data 151 may include different types of templates. For example, there may be statement of work templates that correspond to industry type, enterprise size, enterprise revenue, IT topologies and/or other factors.

In step 706, the document generator 118 selects a specific statement of work template based on the proposed IT topology and the enterprise profile data 124. Each type of statement of work may include different types of templates. For example, there may be statement of work templates that correspond to industry type, enterprise size, enterprise revenue, IT topologies and/or other factors. Accordingly, the IT solutions system 115 may request a statement of work that includes a summary of recommended services and products. In this situation, the document generator 118 can select a statement of work for a summary of products based on the proposed IT topology. In another example, the IT solutions system 115 may request a statement of work for a contract to engage the services of the enterprise solutions provider. The template data 151 may include different templates for contract based on industry type and enterprise size. As such, the document generator 118 selects statement of work template corresponding to a contract that is based on the industry type and the enterprise size for the enterprise IT organization.

In step 709, the document generator 118 identifies an open data field in the selected template. The templates included in the template data 151 may include open data fields that can correspond to the enterprise profile data 124 and the IT topology determined based on the operational goals 127.

In step 712, the document generator 118 populates the open field with the relevant data. For example, the open field may correspond to the organization name. As such, the document generator 118 obtains the enterprise organization name from the enterprise profile data 124 and populates the open data field in the template with the obtained name. Likewise, if the open data field corresponds to a product or service required for implementation of the proposed IT topology, the document generator 118 will obtain the relevant data from the data store 112 and populate the open data field with the data.

In step 715, the document generator 118 determines if there are additional open data fields in the template. If there are additional open data fields, the document generator 118 returns to step 409. Otherwise, the document generator 118 proceeds to step 418.

In step 718, the document generator 118 generates a statement of work based on the selected template and populated data fields. The statement of work can then be included in a user interface 139 displayed to a user interacting with the IT solutions system 115. Thereafter, the process proceeds to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the IT solutions system 115, the document generator 118, the administrator console 121, the client application 163, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for determining an information technology (IT) topology for an enterprise IT organization, the system comprising:
   at least one computing device; and
   at least one application executable on the at least one computing device, wherein, when executed, the at least one application causes the at least one computing device to at least:
   generate enterprise profile data for the enterprise IT organization based at least in part on information about the enterprise IT organization extracted from an entity of the enterprise IT organization using a plurality of visual models associated with an IT solutions provider, the plurality of visual models being designed to facilitate a conversation and extract the information about the enterprise IT organization, at least one of the plurality of visual models comprising a presentation or a video, and the enterprise profile data comprising at least a plurality of operational goals and a current IT topology of the enterprise IT organization;
   determine a proposed IT topology for the enterprise IT organization based on the current IT topology and the plurality of operational goals;
   generate a user interface including a listing of enterprise characteristics and a listing of solution elements, the user interface including a plurality of selectable components that correspond to the enterprise characteristics and the solution elements;

automatically populate a first portion of the selectable components of the plurality of selectable components to indicate a selection of a corresponding portion of the enterprise characteristics and the solution elements, the first portion of the selectable components being selected based at least in part on the plurality of operational goals, the current IT topology, and the proposed IT topology, a second portion of the selectable components remaining unselected; and transmit the user interface to a client device.

2. The system of claim 1, wherein, when executed, the at least one application causes the at least one computing device to at least:

identify a deselection of a particular selectable component of the plurality of selectable components on the user interface; and modify the user interface to adjust one or more selections of a remaining portion of the plurality of selectable components based on the deselection.

3. The system of claim 1, wherein, when executed, the at least one application causes the at least one computing device to at least:

receive a plurality of user inputs from one or more other user interfaces rendered on the client device, the extracted information being based on the plurality of user inputs.

4. The system of claim 1, wherein, when executed, the at least one application causes the at least one computing device to at least:

identify services and products associated with the IT solutions provider based on the proposed IT topology.

5. The system of claim 4, wherein, when executed, the at least one application causes the at least one computing device to at least:

generate a summary of the services and the products related to the proposed IT topology, the summary including a plurality of selectable links corresponding to the services and the products, and wherein a user is redirected to a detail page corresponding to a respective service or a respective product in response to a selection of a given selectable link of the plurality of selectable links.

6. The system of claim 4, wherein, when executed, the at least one application causes the at least one computing device to at least dynamically generate a statement of work in real-time, the statement of work including a contract and a digital signature component, the contract corresponding to an agreement for the IT solutions provider to provide the services and products required to implement the proposed IT topology, and the digital signature component configured to allow the enterprise IT organization to provide a digital signature.

7. The system of claim 1, wherein, when executed, the at least one application causes the at least one computing device to at least:

identify a plurality of technical gaps based on a comparison of the current IT topology with the proposed IT topology;

identify key performance indicator values for a plurality of key performance indicators based on a transitioning to the proposed IT topology; and generate another user interface that illustrates how the proposed IT topology impacts the enterprise IT organization according to a ranking of the key performance indicator values.

8. A computer-implemented method for determining an information technology (IT) topology for an enterprise IT organization, comprising:

generating, by at least one computing device based at least in part on information about the enterprise IT organization extracted from an entity of the enterprise IT organization using a plurality of visual models associated with an IT solutions provider, the plurality of visual models being designed to facilitate a conversation and extract the information about the enterprise IT organization, at least one of the plurality of visual models comprising a presentation or a video, and enterprise profile data for the enterprise IT organization, the enterprise profile data comprising at least a plurality of operational goals and a current IT topology of the enterprise IT organization;

determining, by the at least one computing device, a proposed IT topology for the enterprise IT organization based on the current IT topology and the plurality of operational goals;

generating, by the at least one computing device, a user interface including a listing of enterprise characteristics and a listing of solution elements, the user interface including a plurality of selectable components that correspond to the enterprise characteristics and the solution elements;

automatically populating, by the at least one computing device, a first portion of the selectable components of the plurality of selectable components to indicate a selection of a corresponding portion of the enterprise characteristics and the solution elements, the first portion of the selectable components being selected based at least in part on the plurality of operational goals, the current IT topology, and the proposed IT topology, a second portion of the selectable components remaining unselected; and transmitting, by the at least one computing device, the user interface to a client device.

9. The computer-implemented method of claim 8, further comprising:

identifying a deselection of a particular selectable component of the plurality of selectable components on the user interface; and modifying the user interface to adjust one or more selections of a remaining portion of the plurality of selectable components based on the deselection.

10. The computer-implemented method of claim 8, further comprising receiving a plurality of user inputs from one or more other user interfaces rendered on the client device, the extracted information being based on the plurality of user inputs.

11. The computer-implemented method of claim 8, further comprising identifying services and products associated with the IT solutions provider based on the proposed IT topology.

12. The computer-implemented method of claim 11, further comprising:

generating a summary of the services and the products related to the proposed IT topology, the summary including a plurality of selectable links corresponding to the services and the products, and wherein a user is redirected to a detail page corresponding to a respective service or a respective product in response to a selection of a given selectable link of the plurality of selectable links.

13. The computer-implemented method of claim 11, further comprising dynamically generating a statement of work in real-time, the statement of work including a contract and a digital signature component, the contract corresponding to an agreement for the IT solutions provider to provide the services and products required to implement the proposed IT topology, and the digital signature component configured to allow the enterprise IT organization to provide a digital signature.

14. The computer-implemented method of claim 8, further comprising:
- identifying a plurality of technical gaps based on a comparison of the current IT topology with the proposed IT topology;
- identifying key performance indicator values for a plurality of key performance indicators based on a transitioning to the proposed IT topology; and
- generating another user interface that illustrates how the proposed IT topology impacts the enterprise IT organization according to a ranking of the key performance indicator values.

15. A non-transitory computer-readable medium embodying a program for determining an information technology (IT) topology for an enterprise IT organization, wherein, the program is executable in a computing device, and when executed, the program causes the computing device to at least:
- generate enterprise profile data for the enterprise IT organization based at least in part on information about the enterprise IT organization extracted from an entity of the enterprise IT organization using a plurality of visual models associated with an IT solutions provider, the plurality of visual models being designed to facilitate a conversation and extract the information about the enterprise IT organization, at least one of the plurality of visual models comprising a presentation or a video, and the enterprise profile data comprising at least a plurality of operational goals and a current IT topology of the enterprise IT organization;
- determine a proposed IT topology for the enterprise IT organization based on the current IT topology and the plurality of operational goals;
- generate a user interface including a listing of enterprise characteristics and a listing of solution elements, the user interface including a plurality of selectable components that correspond to the enterprise characteristics and the solution elements;
- automatically populate a first portion of the selectable components of the plurality of selectable components to indicate a selection of a corresponding portion of the enterprise characteristics and the solution elements, the first portion of the selectable components being selected based at least in part on the plurality of operational goals, the current IT topology, and the proposed IT topology, a second portion of the selectable components remaining unselected; and
- transmit the user interface to a client device.

16. The non-transitory computer-readable medium of claim 15, wherein, when executed, the program further causes the computing device to at least:
- identify a deselection of a particular selectable component of the plurality of selectable components on the user interface; and
- modify the user interface to adjust one or more selections of a remaining portion of the plurality of selectable components based on the deselection.

17. The non-transitory computer-readable medium of claim 15, wherein, when executed, the program further causes the computing device to at least: receive a plurality of user inputs from one or more other user interfaces rendered on the client device, the extracted information being based on the plurality of user inputs.

18. The non-transitory computer-readable medium of claim 15, wherein, when executed, the program further causes the computing device to at least: identify services and products associated with the IT solutions provider based on the proposed IT topology.

19. The non-transitory computer-readable medium of claim 18, wherein when executed, the program further causes the computing device to at least:
- generate a summary of the services and the products related to the proposed IT topology, the summary including a plurality of selectable links corresponding to the services and the products, and
- wherein a user is redirected to a detail page corresponding to a respective service or a respective product in response to a selection of a given selectable link of the plurality of selectable links.

20. The non-transitory computer-readable medium of claim 15, when executed, the program further causes the computing device to at least:
- identify a plurality of technical gaps based on a comparison of the current IT topology with the proposed IT topology;
- identify key performance indicator values for a plurality of key performance indicators based on a transitioning to the proposed IT topology; and
- generate another user interface that illustrates how the proposed IT topology impacts the enterprise IT organization according to a ranking of the key performance indicator values.

* * * * *